United States Patent
Moser et al.

(10) Patent No.: US 10,208,711 B2
(45) Date of Patent: Feb. 19, 2019

(54) GAS INJECTOR INCLUDING AN OUTWARDLY OPENING VALVE CLOSURE ELEMENT

(71) Applicant: Robert Bosch GmbH, Stuttgart (DE)

(72) Inventors: Friedrich Moser, Magstadt (DE); Guenther Hohl, Stuttgart (DE); Michael Knorpp, Weissach (DE); Olaf Schoenrock, Stuttgart-Weilimdorf (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/524,913

(22) PCT Filed: Sep. 29, 2015

(86) PCT No.: PCT/EP2015/072301
§ 371 (c)(1),
(2) Date: May 5, 2017

(87) PCT Pub. No.: WO2016/082983
PCT Pub. Date: Jun. 2, 2016

(65) Prior Publication Data
US 2017/0321636 A1    Nov. 9, 2017

(30) Foreign Application Priority Data
Nov. 28, 2014  (DE) .......... 10 2014 224 344

(51) Int. Cl.
*F02M 21/02*   (2006.01)
*F02M 57/04*   (2006.01)
(Continued)

(52) U.S. Cl.
CPC ...... *F02M 21/0269* (2013.01); *F02M 21/026* (2013.01); *F02M 21/0257* (2013.01);
(Continued)

(58) Field of Classification Search
CPC ... F16K 1/38; F16K 31/0655; F02M 21/0257; F02M 21/0259; F02M 21/0269; Y02T 10/32
(Continued)

(56) References Cited

U.S. PATENT DOCUMENTS

| | | | |
|---|---|---|---|
| 5,546,902 A | * | 8/1996 | Paluch ................ F02M 43/04 123/304 |
| 5,593,095 A | * | 1/1997 | Davis ................. F02M 61/08 239/533.12 |

(Continued)

FOREIGN PATENT DOCUMENTS

| | | |
|---|---|---|
| EP | 2206941 A1 | 7/2010 |
| WO | 9323668 A1 | 11/1993 |
| WO | 2012101003 A1 | 8/2012 |

OTHER PUBLICATIONS

International Search Report dated Jan. 20, 2016, of the corresponding International Application PCT/EP2015/072301 filed Sep. 29, 2015.

*Primary Examiner* — Hieu T Vo
*Assistant Examiner* — Arnold Castro
(74) *Attorney, Agent, or Firm* — Norton Rose Fulbright US LLP; Gerard Messina (57) ABSTRACT

A gas injector for directly injecting a gaseous fuel into a combustion chamber of an internal combustion engine, including a valve closure element for releasing and closing a passage opening, the valve closure element opening in the direction of a flow direction of the gas injector, a sealing seat between the valve closure element and a valve body, a flow-guiding element being situated downstream of the sealing seat in the flow direction of the gas injector and configured to form a gas jet to be injected into the combustion chamber.

24 Claims, 8 Drawing Sheets

(51) Int. Cl.
*F16K 31/06* (2006.01)
*F16K 1/36* (2006.01)
*F16K 1/38* (2006.01)

(52) U.S. Cl.
CPC .... *F02M 21/0275* (2013.01); *F02M 21/0281* (2013.01); *F16K 1/36* (2013.01); *F16K 1/38* (2013.01); *F16K 31/0655* (2013.01); *F02M 57/04* (2013.01); *Y02T 10/32* (2013.01)

(58) Field of Classification Search
USPC .. 239/533.12, 533.2, 584, 585.5, 589, 533.7
See application file for complete search history.

(56) References Cited

U.S. PATENT DOCUMENTS

| | | | | |
|---|---|---|---|---|
| 5,685,492 | A * | 11/1997 | Davis | F02M 61/08 239/533.12 |
| 5,833,142 | A * | 11/1998 | Caley | F02M 61/06 239/453 |
| 6,230,991 | B1 * | 5/2001 | Steinruck | F16K 31/0693 239/585.1 |
| 7,942,349 | B1 * | 5/2011 | Meyer | F02M 61/08 123/294 |
| 2001/0025892 | A1 | 10/2001 | McCoy et al. | |
| 2005/0082393 | A1 | 4/2005 | Borissov | |

* cited by examiner

GAS INJECTOR INCLUDING AN OUTWARDLY OPENING VALVE CLOSURE ELEMENT

FIELD

The present invention relates to a direct-injecting gas injector for directly injecting a gaseous fuel into a combustion chamber of an internal combustion engine including an outwardly opening valve closure element and improved characteristics for injection into a combustion chamber.

BACKGROUND INFORMATION

Recently, in addition to liquid fuels, recently gaseous fuels, for example, natural gas or hydrogen are also increasingly being used in internal combustion engines. In the case of injectors for liquid fuels, outwardly-opening valve closure elements are used, which, for example, use sealing seat geometries, such as a ball, against a spherical section or the like. In this case, a seat angle on the cone defines the angle of the jet occurring in the combustion chamber and thus the mixture formation. If a customer desires another injection jet, this is usually made possible by a modification of the seat angle. However, in the case of liquid fuels, care must be taken to prevent the fuel from wetting a wall, since this entails the risk of droplet formation, which may result in impermissible particulate emissions and exhaust gas problems.

SUMMARY

An example direct-injection gas injector according to the present invention for the direct injection of gaseous fuel into a combustion chamber of an internal combustion engine may have the advantage that customer-specific approaches are possible without great effort. According to the present invention, an independent design of a valve seat and a fuel flow in the combustion chamber is possible for the first time in an outwardly opening injector in gas injectors. Outwardly opening valve closure elements have the property that the direction of movement for opening is directed in the direction of the combustion chamber of the internal combustion engine. Consequently, a desired shape of a gas jet in the combustion chamber may be designed individually for customers, independently of a valve seat or other geometrical conditions. Since the present invention is limited to gas injectors which use gaseous fuels, there is also no risk of wetting walls including the associated exhaust gas problems which is present in the case of liquid fuels. According to the present invention, a cost-effective modular concept may thus be made possible to make customer-specific jet designs possible. Another great advantage of the present invention is that the gas injector may also be situated individually at any position on the combustion chamber, for example for a central installation in the cylinder head or also a lateral or inclined installation in the axial direction of the cylinder of the internal combustion engine. As a result, further design freedoms may be gained, which is very important due to the effort to reduce the size of internal combustion engines. Individual space-optimized approaches and installation positions of the injector may also be made possible. According to the present invention, this is achieved by the fact that the gas injector has a valve closure element for releasing and closing a passage opening. The valve closure element is in this case an outwardly opening valve closure element, for example, a valve needle, which opens in a flow direction of the gas injector. Furthermore, the gas injector includes a sealing seat between the valve closure element and a valve body, as well as a flow-guiding element. The flow-guiding element is configured to form a gas jet to be injected into the combustion chamber. Consequently, the geometric design of the flow-guiding element may be used to respond individually to customer-specific wishes with regard to a gas jet to be injected.

Preferred refinements of the present invention are described herein.

Preferably, the flow-guiding element is situated on the valve body. It is particularly preferred that the flow-guiding element is designed integrally with the valve body. As a result, a very simple and cost-effective manufacturing may be achieved. For different shapes of a gas jet, it is only necessary to simply exchange the valve body in each case.

It is also preferred that the flow-guiding element is situated on the valve closure element. Preferably, the flow-guiding element is provided integrally connected to the valve-closure element. Also, this measure makes it possible to achieve a shaping of a gas jet to be injected into a combustion chamber.

It is particularly preferred that the flow-guiding element includes both a device for flow guidance on the valve closure element and a device for flow guidance on the valve body.

Preferably, the flow-guiding element includes a partial sphere surface as a flow guide. By changing a radius of the partial sphere surface, it is possible to obtain a different gas jet to be injected.

According to another preferred embodiment of the present invention, the flow-guiding element includes a conical surface.

It is also possible to combine different geometric shapes with one another, for example, in the flow direction of the gas injector, a partial sphere surface adjoining a conical surface or conversely. Other geometric surfaces, for example, cylindrical surfaces or the like, are also possible.

According to another preferred embodiment of the present invention, a center axis of a gas jet to be injected intersects an axial axis of the gas injector at an angle γ. Angle γ is preferably in a range between 0° and 180°. As a result, the gas jet to be injected may be configured individually for customers. Angle γ is in a range from 0 to 60°, particularly preferably in a range from 10 to 60°.

According to another preferred embodiment of the present invention, the sealing seat between the valve closure element and valve body is a flat seat. According to the present invention, a gas injector for injecting a gaseous fuel is thus proposed for the first time, which has a flat seat as a sealing seat and which is provided as an outwardly opening injector. The great advantage of a flat seat in the case of gaseous fuels is in particular that there is a relatively wide sealing surface between the valve closure element and valve body and thus a secure seal may be provided in a relatively simple and cost-effective manner.

It is also preferred that the flow-guiding element is designed asymmetrically. This measure makes it possible to obtain very individual jet shapes for injecting into the combustion chamber. In particular, it is possible in this way, for example, to achieve flows which cause the gas jet to be applied to a cylinder head roof (coanda effect) or the gas jet to be collapsed into a concentrated central jet. As a result, the gas jet may be modulated in such a way that optimum mixture formation is achievable in the combustion chamber.

According to an alternative embodiment of the present invention, the flow-guiding element is designed symmetrically. As a result, symmetrical shapes of the gas jet in the combustion chamber may be achieved.

In order to make a particularly simple design possible, the valve closure element preferably has a conical sealing surface. This makes it possible to provide a sealing seat, which is simple to manufacture, between the valve closure element and the valve body.

The present invention also relates to an internal combustion engine including a combustion chamber and a gas injector according to the present invention, the gas injector being situated directly on the combustion chamber in order to inject gaseous fuel directly into the combustion chamber.

The internal combustion engine further preferably includes a cylinder head, the gas injector according to the present invention being situated at a predetermined distance from an end of the cylinder head directed toward the combustion chamber. According to an alternative embodiment, the gas injector protrudes by a predetermined distance from an end of the cylinder head directed toward the combustion chamber. In other words, the gas injector partially protrudes into the combustion chamber. Both measures may be used for obtaining different jet shapes of the gas jet.

It is also preferred that the gas injector is situated in the internal combustion engine at a predetermined angle to a center axis of the combustion chamber. This also makes a lateral mounting of the gas injector on the combustion chamber possible, so that a high design freedom with regard to positioning of the gas injector on the combustion chamber is obtained. This is particularly advantageous, since there are ongoing efforts to reduce the overall sizes of internal combustion engines or reduce their number of cylinders, so that an increasingly smaller installation space is present on the internal combustion engines.

BRIEF DESCRIPTION OF THE DRAWINGS

Preferred exemplary embodiments of the present invention are explained in greater detail below with reference to the figures. Identical or functionally identical parts are denoted using the same reference symbols.

DETAILED DESCRIPTION OF EXAMPLE EMBODIMENTS

A gas injector 1 according to a first preferred exemplary embodiment of the present invention is described in detail below with reference to FIG. 1.

Figure 1:
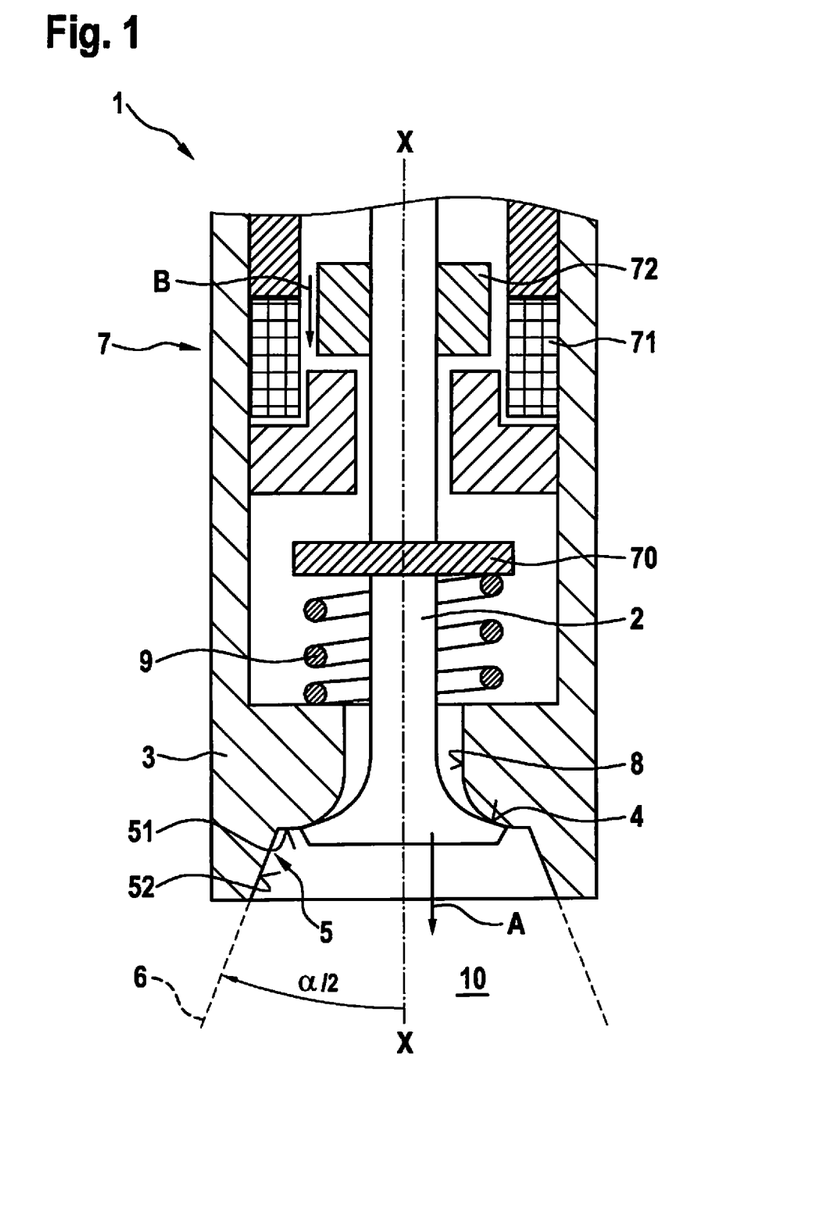
FIG. 1 shows a schematic sectional view of a gas injector according to a first exemplary embodiment of the present invention.

As shown in FIG. 1, gas injector 1 includes a valve closure element 2, which in this exemplary embodiment is a valve needle. Gas injector 1 is an outwardly opening gas injector, since valve closure element 2 opens in the direction of flow (arrow B). This means that valve closure element 2 lifts off from a valve seat 4 in the direction of a combustion chamber 10. In FIG. 1, the direction of movement for opening valve closure element 2 is indicated by arrow A.

Valve closure element 2 opens and closes a passage opening 8, which is formed in a valve body 3. Valve body 3 also forms the housing of gas injector 1.

Valve closure element 2 is opened with the aid of a solenoid actuator 7. Solenoid actuator 7 includes an armature 70, which is directly connected to the valve closure element 2. Furthermore, a coil 71 and an internal pole 72 are provided. When coil 71 is energized, the armature is moved in the direction of combustion chamber 10 against a spring force of a restoring element 9, as a result of which valve closure element 2 lifts off from sealing seat 4. As a result, passage opening 8 is released, so that gaseous fuel is injected into combustion chamber 10.

FIG. 1 schematically shows a gas jet 6 in dashed lines, which indicates the gaseous spray into combustion chamber 10 in the opened state of gas injector 1. Gas jet 6 has a conical outer surface. In order to achieve this, a flow-guiding element 5 is provided according to the present invention. Flow-guiding element 5 is integrally formed with valve body 3 and includes a first guide surface 51 and a second guide surface 52. First guide surface 51 is perpendicular to an axial axis X-X of gas injector 1. Immediately adjoining this is second guide surface 52, which is conical in design. As a result, gas jet 6 acquires the conical outer surface area.

An angle between axial axis X-X and flow-guiding element 5 is denoted by α/2 and is approximately 250. This angle α may be arbitrarily set between 0° and 180° according to the requirements of the combustion method.

According to the present invention, flow-guiding element 5 is thus situated downstream of sealing seat 4 in flow direction B of gas injector 1. Consequently, according to the present invention, a shaping of gas jet 6 is carried out separately from sealing seat 4 or from an annular gap between valve closure element 2 and valve body 3 in the completely open state of the gas injector, which defines the maximum volume flow. As a result, a customer-specific design of flow-guiding element 5 may be made possible. According to the present invention, sealing seat 4 may also be optimized independently of additional, in particular, shaping influences for gas jet 6 in order to optimally absorb occurring flow forces and closing forces. This is achieved according to the present invention in combination with an outwardly opening gas injector 1. Consequently, a very variable design of gas injector 1 is obtained, which is possible both for a central installation as shown in FIG. 1, and a lateral installation in a cylinder head. Consequently, an independent design of sealing seat 4 and the fuel flow, i.e., generated gas jet 6, may be obtained in combustion chamber 10 for an outwardly opening gas injector 1 by the positioning of flow-guiding element 5 downstream of sealing seat 4. Since, according to the present invention a gaseous fuel is provided, the problem in the case of liquid fuels, namely that droplets form on flow-guiding element 5 resulting in a detrimental effect on the formation of exhaust gas, does not arise either.

Figure 2:
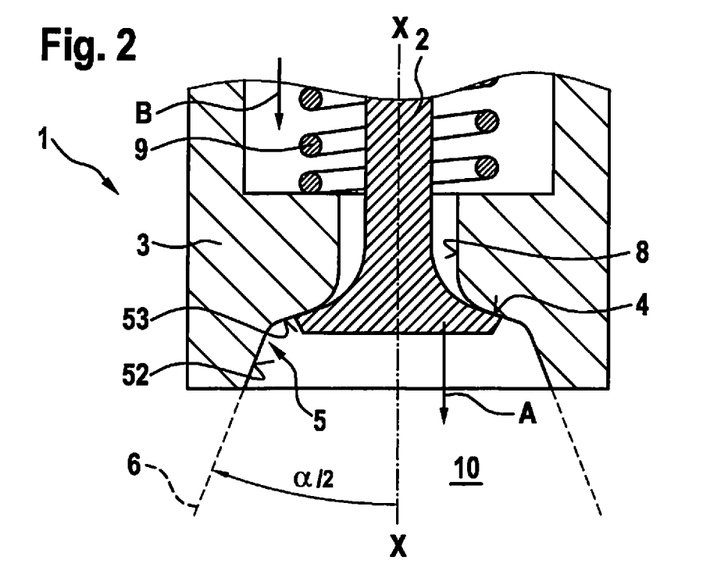
FIGS. 2 to 15 show various further exemplary embodiments of the gas injector according to the present invention.

FIG. 2 shows a gas injector 1 according to a second exemplary embodiment of the present invention. As is apparent from FIG. 1, flow-guiding element 5 includes, as in the first exemplary embodiment, a second conical guide surface 52. However, the guide surface provided between second guide surface 52 and sealing seat 4 in the second exemplary embodiment is designed as an arcuate guide surface 53. As a result, a continuous transition from arcuate guide surface 53 into second conical guide surface 52 may be made possible.

Figure 3:
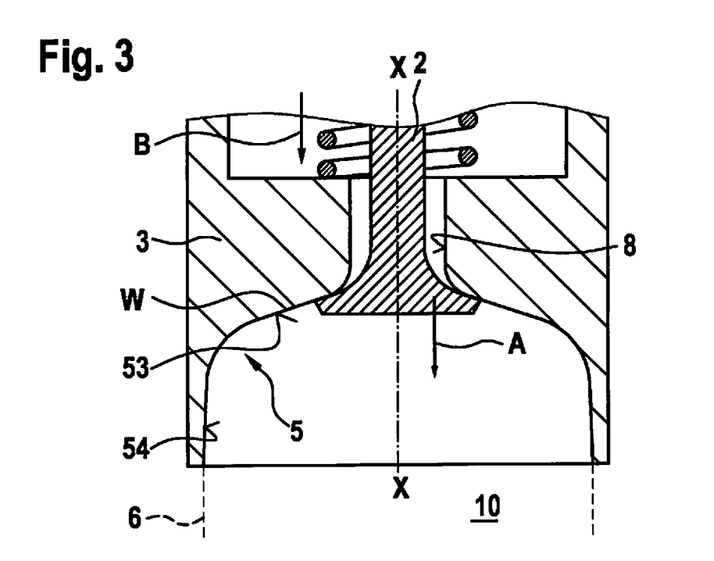

FIG. 3 shows a gas injector 1 according to a third exemplary embodiment of the present invention. In this third exemplary embodiment, flow-guiding element 5 includes, as shown in FIG. 2, first arcuate guide surface 53 and a second arcuate guide surface 54. Between the two arcuate guide surfaces 53, 54, an inflection point W, which may be seen in a cross-sectional plane, is provided in the geometric profile of flow-guiding element 5. In particular, this results in a so-called central jet as gas jet 6, which is essentially annular-cylindrical and consequently parallel to axial axis X-X of gas injector 1. Instead of being cylindrical, the surface of gas jet 6 may also be slightly conical.

Figure 4:
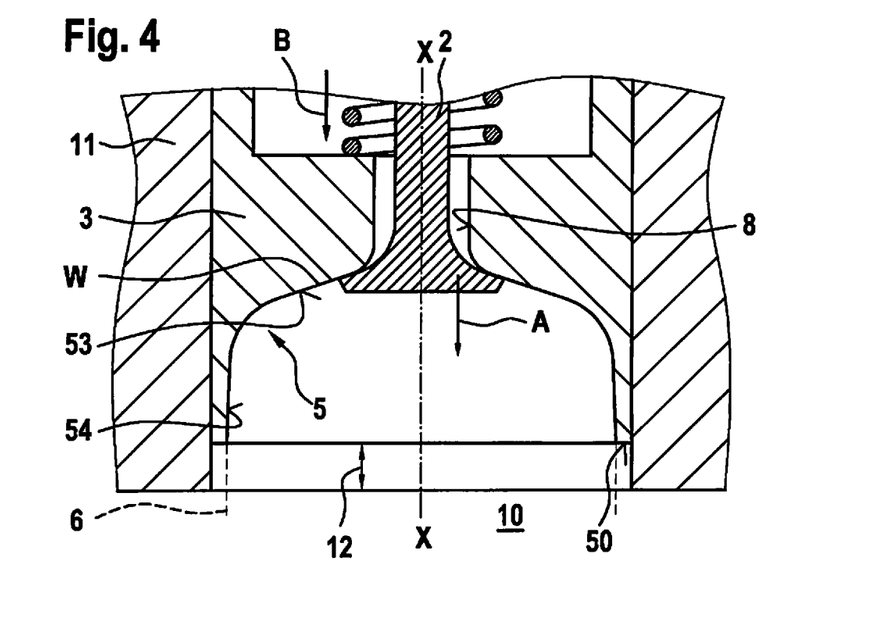

FIG. 4 shows a gas injector according to a fourth exemplary embodiment of the present invention, whereby an installation position in a cylinder head 11 is shown in particular. As is apparent from FIG. 4, gas injector 1 is set back somewhat from combustion chamber 10. More precisely, a distance 12 is provided between a combustion chamber-side end of cylinder head 11 and a combustion chamber-side end 50 of flow-guiding element 5. Sealing seat 4 may be positioned somewhat farther away from hot combustion chamber 10, so that an elastomeric sealing element may also be considered as a sealing element.

Figure 5:
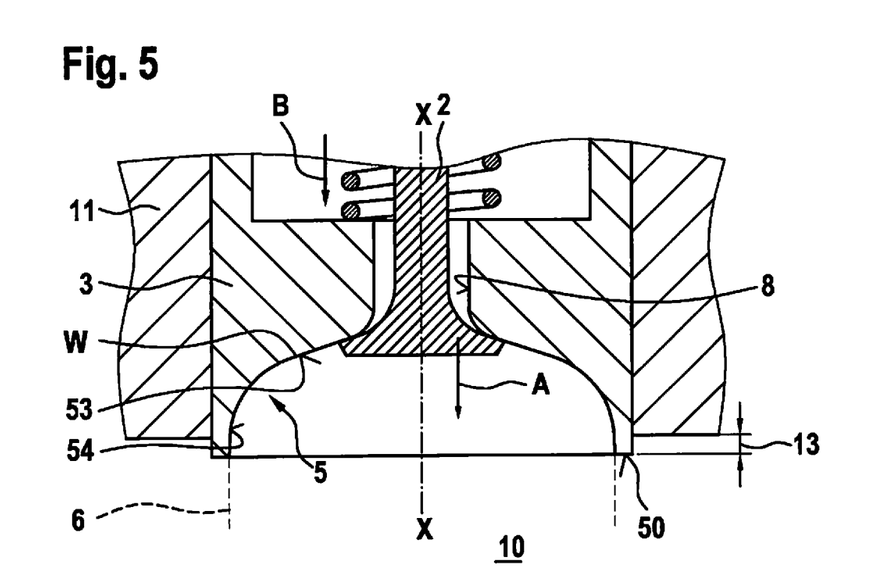

FIG. 5 shows a fifth exemplary embodiment of gas injector 1, which represents a different installation position from that shown in FIG. 4. In the fifth exemplary embodiment, gas injector 1 is situated protruding into the combustion chamber, a combustion-side end of flow-guiding element 5 protruding into combustion chamber 10 from the combustion-side end of cylinder 11 by a distance 13.

In the fifth exemplary embodiment, a conical gas jet 6 results, since combustion chamber-side end 50 of flow-guiding element 5 is shortened compared to FIG. 4.

Figure 6:
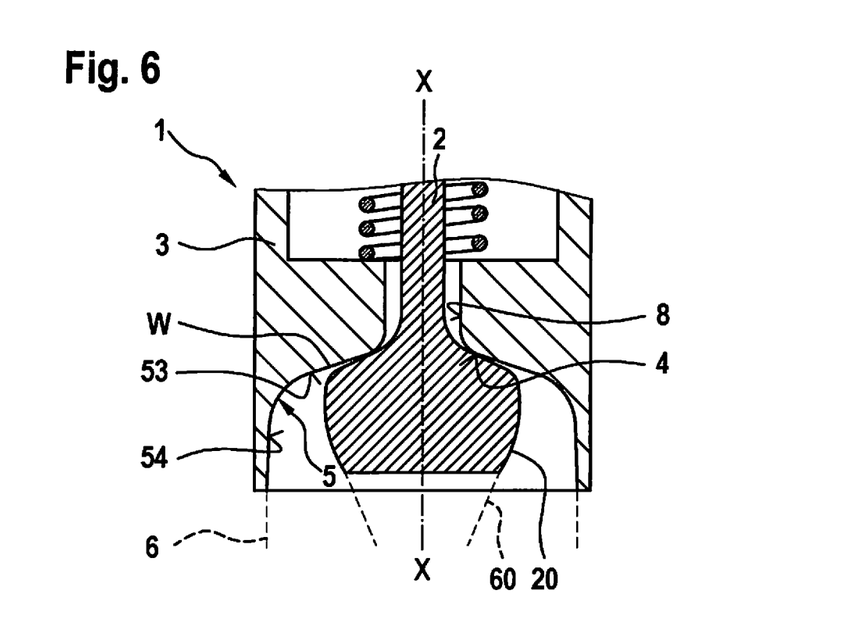

FIG. 6 shows a gas injector 1 according to a sixth exemplary embodiment of the present invention. The shaping of flow-guiding element 5 of the sixth exemplary embodiment corresponds to that of the third exemplary embodiment, so that flow-guiding element 5 of the sixth exemplary embodiment includes a first arcuate guide surface 53 and a second arcuate guide surface 54, which are connected to one another via an inflection point W. In contrast to the third exemplary embodiment, however, valve closing element 2 is also designed to have a flow-guiding area 20. Flow-guiding element 5 on valve body 3 is responsible for the shaping of gas jet 6 on the outer surface of the gas jet, and flow-guiding area 20, which is formed downstream of sealing seat 4 on valve closing element 2, is responsible for the shaping of an inner surface area 60 of gas jet 6. Consequently, in addition to flow-guiding element 5 on valve body 3, a flow-guiding area 20 is also provided on valve closure element 2. As a result, a very exact shaping of gas jet 6 may be obtained both on its outer circumference and also on its inner circumference. In this exemplary embodiment, flow-guiding area 20 is formed in such a way that a tapering inner surface area is obtained on inner circumference 60.

Figure 7:
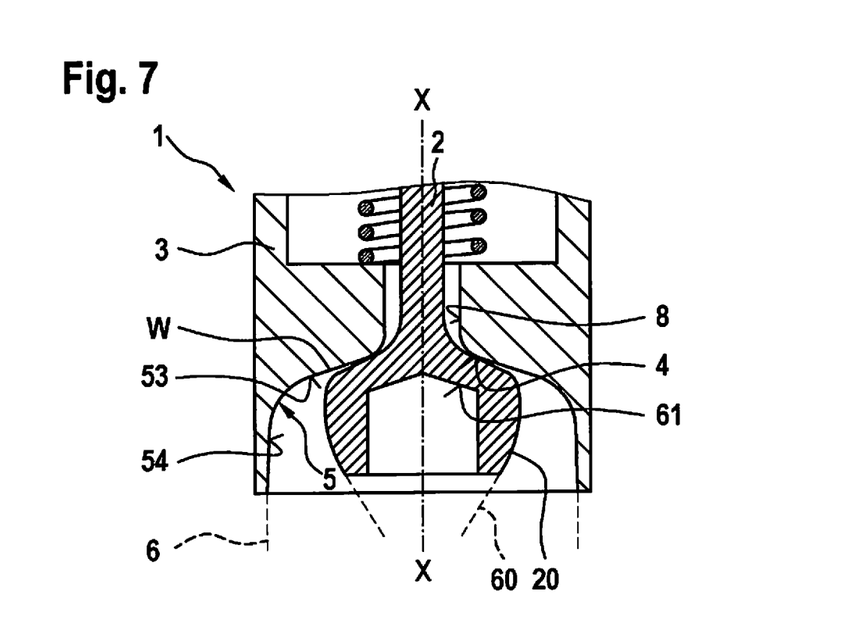

FIG. 7 shows a gas injector 1 according to a seventh exemplary embodiment of the present invention. The seventh exemplary embodiment essentially corresponds to the sixth exemplary embodiment, whereby a recess 61 is provided for reducing the weight on valve closure element 2 in the area downstream of sealing seat 4. As a result, a faster movement of valve closure element 2 for opening and closing may be ensured.

Figure 8:
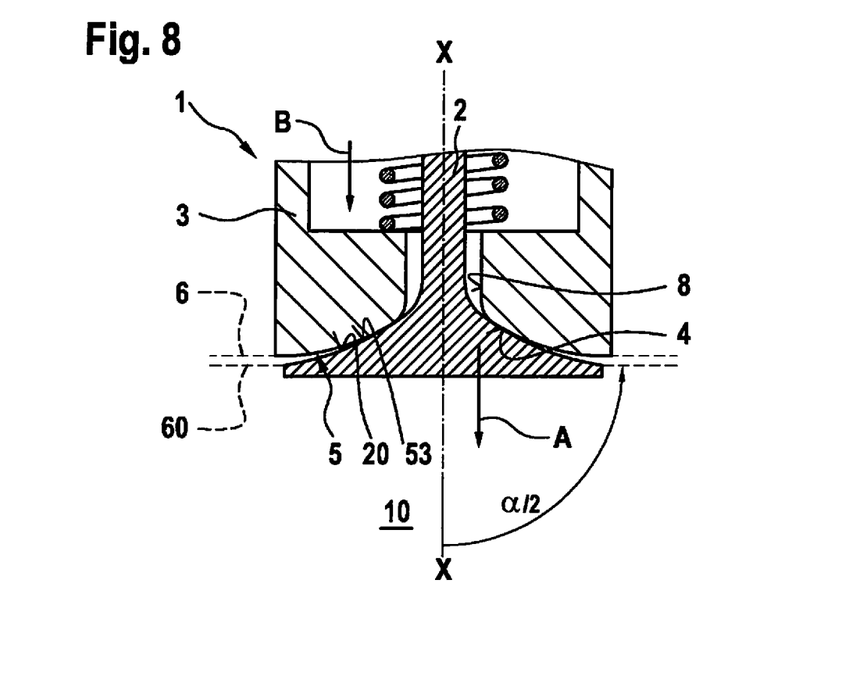

FIG. 8 shows a gas injector 1 according to an eighth exemplary embodiment of the present invention. In contrast to the preceding exemplary embodiment, in the eighth exemplary embodiment, flow guiding element 5 is formed in such a way that a radial outflow of gas jet 6 from valve body 3 is possible. On valve closure element 2, flow guiding element is formed in such a way that the radial outflow is assisted. Flow-guiding element 5 includes an arcuate guide surface 53, so that radial outflow is achieved.

FIGS. 9 through 12 show a gas injector 1, which in each case has a flat sealing seat 4. In this case, a sealing partner 30 on valve body 3 has a surface which is perpendicular to axial axis X-X.

Figure 9:
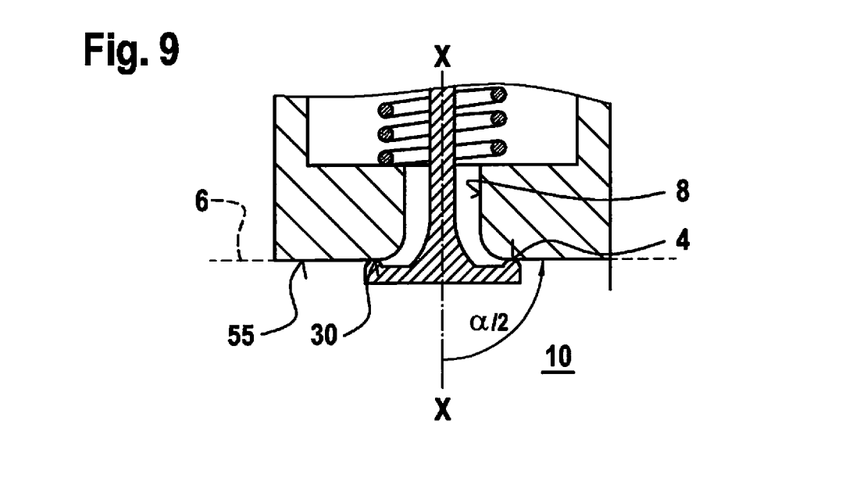

In the ninth exemplary embodiment of gas injector 1 shown in FIG. 9, a radial outflow of gas jet 6 is implemented as in FIG. 8. In this case, flow-guiding element 5 is provided with a surface 55, which is perpendicular to axial axis X-X.

Figure 10:
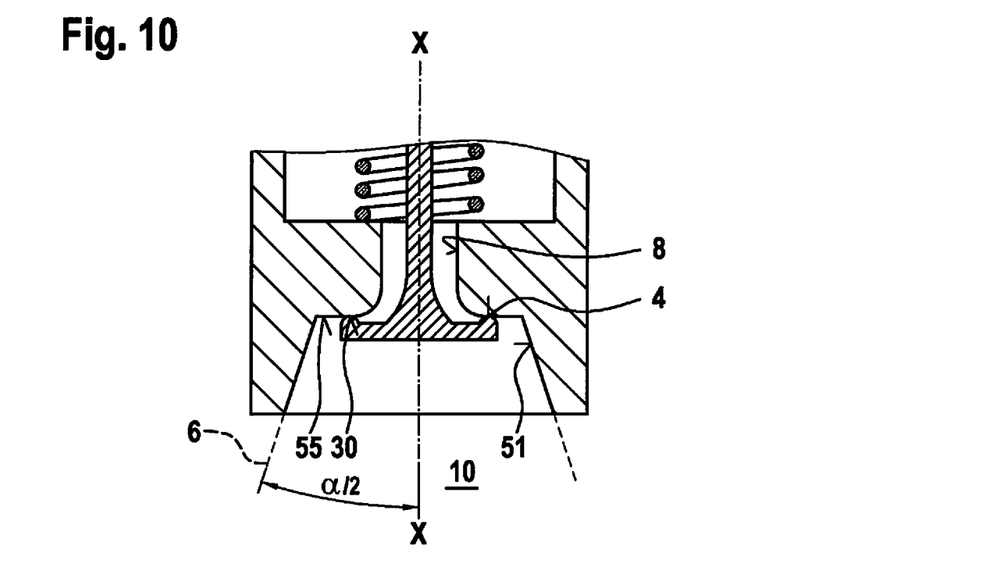

In the tenth exemplary embodiment of gas injector 1 shown in FIG. 10, flow-guiding element 5 includes a guide area on surface 55, which is perpendicular to axial axis X-X, and a guide surface 51, which is conical. This results in a gas jet 6, similar to the first exemplary embodiment in FIG. 1, but with the difference that, in the case of an outwardly opening gas injector 1, a flat sealing seat 4 is now implemented.

Figure 11:
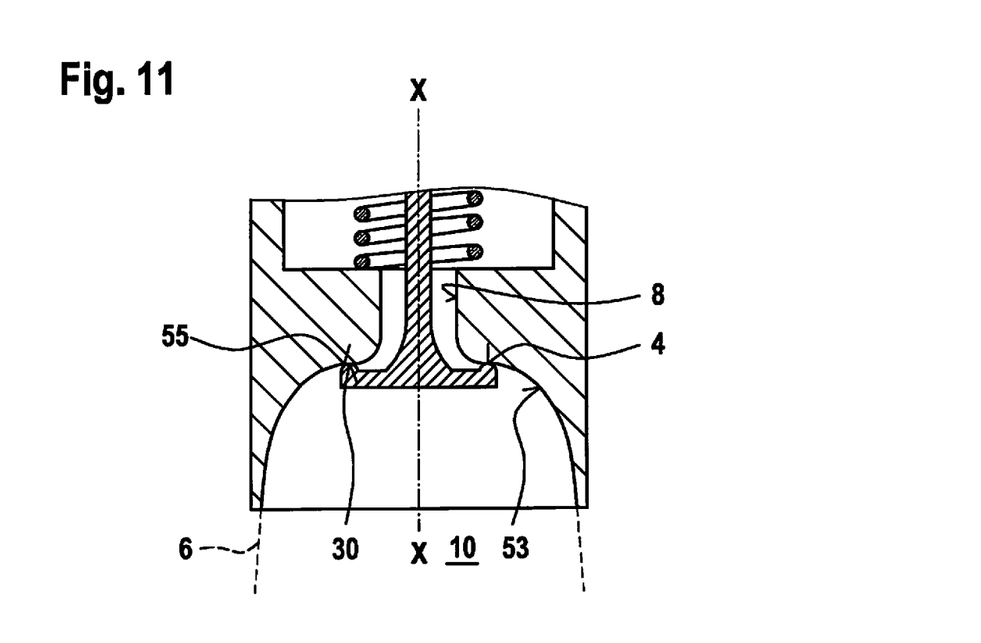

The eleventh exemplary embodiment of gas injector 1 shown in FIG. 11 includes a flow-guiding element 5 including an arcuate guide surface 53 in combination with a flat sealing seat 4. As a result of this, it is essentially possible to achieve a conically expanding gas jet 6, a flat seat being provided as a sealing seat.

Figure 12:
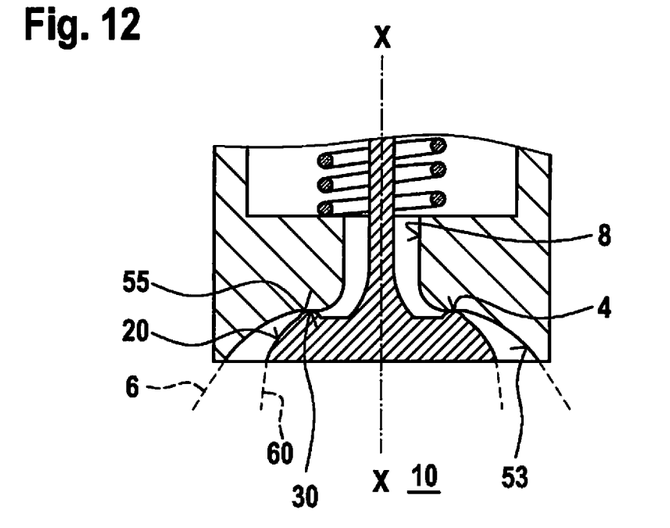

FIG. 12 shows a gas injector 1 according to a twelfth exemplary embodiment of the present invention, whereby, in addition to flow-guiding element 5 on valve body 3, a flow-guiding area 20 is also provided on valve closure element 2. This results in an annular gas jet 6, which expands in the combustion chamber. An inner circumference 60 of gas jet 6 is defined here by the shaping of flow-guiding area 10 on valve closure element 2.

Figure 13:
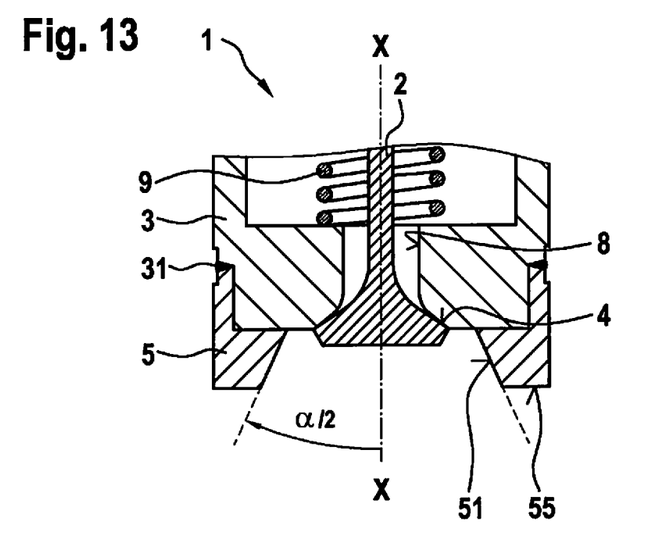

FIG. 13 shows a gas injector 1 according to a thirteenth exemplary embodiment of the present invention. A shaping of gas jet 6 corresponds to the exemplary embodiment shown in FIG. 10 having a rectilinear surface 55 which is perpendicular to axial axis X-X and a conical guide surface 51. However, flow-guiding element 5 is provided as a separate component on valve body 3 in the thirteenth exemplary embodiment. Flow-guiding element 5 is, for example, connected to valve body 3 with the aid of a weld 31. Consequently, valve body 3 and flow-guiding element 2 are provided as a two-part component; however, providing flow-guiding element 5 separately makes it possible to respond in a simple manner to different requirements of internal combustion engine manufacturers by simply exchanging flow-guiding element 5.

Gas injectors 1 described in the preceding exemplary embodiments in FIGS. 1 through 13 each have a symmetrical design of flow-guiding element 5 as well as of valve closure element 2 with respect to axial axis X-X.

Figure 14:
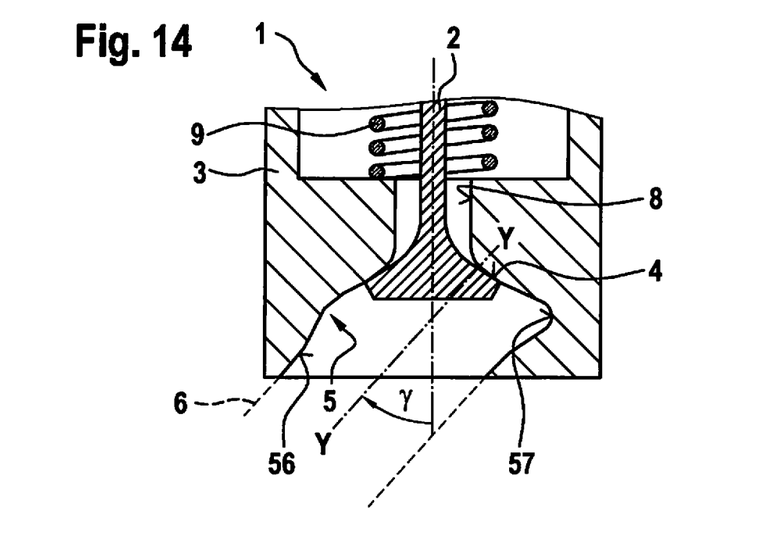

The fourteenth exemplary embodiment of gas injector 1 shown in FIG. 14, on the other hand, shows a design of flow-guiding element 5 in asymmetrical form. In other words, flow-guiding element 5 is asymmetrical in relation to axial axis X-X. As is apparent from FIG. 14, a first area 56 formed by a plurality of arcuate surfaces and a second area 57 having a recess, result. As a result, a gas jet 6 is achieved, center axis Y-Y of which is at an angle γ in relation to axial axis X-X. Consequently, the present invention makes it possible to define a jet angle γ in relation to axial axis X-X and adapt it to particular customer requirements. In the exemplary embodiment, gas jet 6 is provided in cylindrical form.

Figure 15:
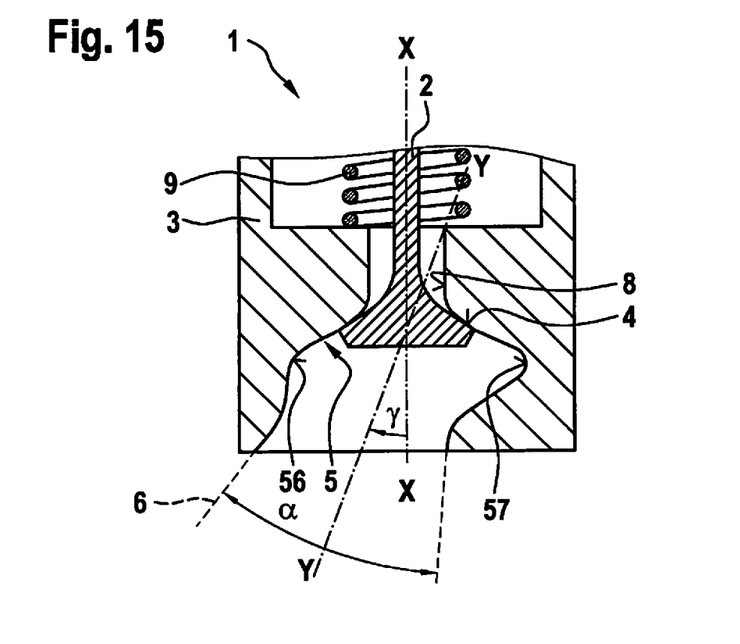

FIG. 15 shows a fifteenth exemplary embodiment of the present invention in which flow-guiding element 5 of gas injector 1 is likewise designed asymmetrically. A conical gas jet 6 is achieved by the shaping of flow-guiding element 5 in this exemplary embodiment.

According to the present invention, in the case of an outwardly opening gas injector, a separation of the geometry of the sealing seat from the geometry of the jet formation, which is predefined with the aid of flow-guiding element 5 on valve body 3 and/or flow-guiding area 20 on valve closure element 2, is achieved for the first time. As a result, individual approaches for gas jets 6, which are injected directly into a combustion chamber 10, are possible. Therefore, the fact is particularly utilized that due to the gaseous fuel there is no wall wetting and droplet formation of the fuel during the injection process. Consequently, sealing seat 4 may also be designed independently of the jet application process of gas jet 6.

What is claimed is:

1. A gas injector for directly injecting a gaseous fuel into a combustion chamber of an internal combustion engine, comprising:
    a valve body; and
    a valve closure element for releasing and closing a passage opening, the valve closure element opening in a direction of a flow direction of the gas injector;
    wherein:
        a sealing seat is formed between the valve closure element and the valve body;
        a flow-guiding element is situated downstream of the sealing seat in the flow direction of the gas injector, and is configured to form a gas jet to be injected into the combustion chamber; and
        at least one of:
            the flow-guiding element includes a surface that (a) extends to an exit end opening of the gas injector from which the fuel, flowing in the flow direction, can exit the gas injector and (b) is shaped such that, upon the exit of the fuel from the fuel injector through the exit end opening, the fuel exits as the gas jet having a center axis that is at a non-straight angle to a longitudinal axis of the gas injector, and at least a portion of the valve closure member, in a direction parallel to the longitudinal axis, overlies at least a portion of the exit end opening of the gas injector;
            the flow-guiding element is a cap capping, and formed as a separate element from, the valve body and includes:
                (i) a surface that (a) faces opposite the flow direction, (b) extends perpendicular to the longitudinal axis of the gas injector, and (c) sits flush against a bottom surface of the valve body; and
                (ii) a radially interior surface that is at a non-straight angle to the bottom surface of the valve body and at a non-straight angle to the longitudinal axis; and
            the flow-guiding element includes a radially exterior surface and a radially interior surface formed by a radially exterior surface of the valve closure element, the radially exterior and interior surfaces of the flow-guiding element are shaped such that, when fuel exits the gas injector, the radially exterior and interior surfaces of the flow-guiding element shape the fuel into the gas jet including an exterior-most circumference of the gas jet and an interior most circumference of the gas jet surrounding a hollow.

2. The gas injector as recited in claim 1, wherein the flow-guiding element is situated on the valve body.

3. The gas injector as recited in claim 2, wherein the flow-guiding element is integrally formed with the valve body.

4. The gas injector as recited in claim 1, wherein the flow-guiding element is situated on the valve closure element.

5. The gas injector as recited in claim 4, wherein the flow-guiding element is integrally formed with the valve closure element.

6. The gas injector as recited in claim 1, wherein the flow-guiding element includes a partial sphere surface.

7. The gas injector as recited in claim 1, wherein the flow-guiding element includes a conical surface.

8. The gas injector as recited in claim 1, wherein the flow-guiding element includes a cylindrical surface.

9. The gas injector as recited in claim 1, wherein the flow-guiding element includes the surface that (a) extends to the exit end opening of the gas injector from which the fuel, flowing in the flow direction, can exit the gas injector and (b) is shaped such that, upon the exit of the fuel from the fuel injector through the exit end opening, the fuel exits as the gas jet having a center axis that is at a non-straight angle to a longitudinal axis of the gas injector, and at least a portion of the valve closure member, in a direction parallel to the longitudinal axis, overlies at least a portion of the exit end opening of the gas injector.

10. The gas injector as recited in claim 9, wherein the angle is between 0° and 60°.

11. The gas injector as recited in claim 9, wherein the angle is in a range from 10° through 60°.

12. The gas injector as recited in claim 1, wherein the sealing seat is a flat seat.

13. The gas injector as recited in claim 1, wherein the flow-guiding element is of symmetrical design.

14. The gas injector as recited in claim 1, wherein the flow-guiding element is configured to generate one of a cylindrical or conical or annular gas jet.

15. The gas injector as recited in claim 1, wherein the valve closure element has a conical sealing surface on the sealing seat.

16. The gas injector as recited in claim 1, wherein the flow-guiding element includes a first and a second arcuate guide surface, which are connected to one another by an inflection point apparent in a cross-sectional plane.

17. An internal combustion engine, comprising:
    a cylinder head;
    a gas injector situated directly on a combustion chamber and in the cylinder head, the gas injector for directly injecting a gaseous fuel into the combustion chamber, the gas injector including:
    a valve body; and
    a valve closure element for releasing and closing a passage opening, the valve closure element opening in a direction of a flow direction of the gas injector;
    wherein:
        a sealing seat is formed between the valve closure element and the valve body;
        a flow-guiding element is situated downstream of the sealing seat in the flow direction of the gas injector, and is configured to form a gas jet to be injected into the combustion chamber; and
        at least one of:
            the flow-guiding element includes a surface that (a) extends to an exit end opening of the gas injector from which the fuel, flowing in the flow direction, can exit the gas injector and (b) is shaped such that, upon the exit of the fuel from the fuel injector through the exit end opening, the fuel exits as the gas jet having a center axis that is at a non-straight angle to a longitudinal axis of the gas injector, and at least a portion of the valve closure member, in a direction parallel to the longitudinal axis, overlies at least a portion of the exit end opening of the gas injector;

the flow-guiding element is a cap capping, and formed as a separate element from, the valve body and includes:
(i) a surface that (a) faces opposite the flow direction, (b) extends perpendicular to the longitudinal axis of the gas injector, and (c) sits flush against a bottom surface of the valve body; and
(ii) a radially interior surface that is at a non-straight angle to the bottom surface of the valve body and at a non-straight angle to the longitudinal axis; and the flow-guiding element includes a radially exterior surface and a radially interior surface formed by a radially exterior surface of the valve closure element, the radially exterior and interior surfaces of the flow-guiding element are shaped such that, when fuel exits the gas injector, the radially exterior and interior surfaces of the flow-guiding element shape the fuel into the gas jet including an exterior-most circumference of the gas jet and an interior most circumference of the gas jet surrounding a hollow.

18. The internal combustion engine as recited in claim 17, wherein the gas injector is situated in the cylinder head in such a way that a combustion chamber-side end of the flow-guiding element is spaced at a distance from a combustion chamber-side end of the cylinder head.

19. The internal combustion engine as recited in claim 18, wherein the combustion chamber-side end of the flow-guiding element protrudes into the combustion chamber.

20. The gas injector as recited in claim 1, wherein the flow-guiding element is the cap that caps, is formed as a separate element from, the valve body, and includes:
(i) the surface that (a) faces opposite the flow direction, (b) extends perpendicular to the longitudinal axis of the gas injector, and (c) sits flush against the bottom surface of the valve body; and
(ii) the radially interior surface that is at the non-straight angle to the bottom surface of the valve body and at the non-straight angle to the longitudinal axis.

21. The gas injector as recited in claim 1, wherein the flow-guiding element includes the radially exterior surface and the radially interior surface formed by the radially exterior surface of the valve closure element, the radially exterior and interior surfaces of the flow-guiding element are shaped such that, when fuel exits the gas injector, the radially exterior and interior surfaces of the flow-guiding element shape the fuel into the gas jet that includes the exterior-most circumference and the interior most circumference surrounding the hollow.

22. The gas injector as recited in claim 21, wherein, in the flow direction, the exterior surface of the valve closure member tapers radially inwardly down to an angled edge of the valve closure member.

23. The gas injector as recited in claim 21, wherein the valve closure member includes, a radially interior surface that is at least partially surrounded by the tapered radially exterior surface of the valve closure member and that forms a hollow within the valve closure member.

24. The gas injector as recited in claim 9, wherein the at least the portion of the valve closure member overlying the at least the portion of the exit includes a central longitudinal axis of the valve closure member.

* * * * *